US00RE37605E

(19) United States
(12) Reissued Patent
Clay

(10) Patent Number: US RE37,605 E
(45) Date of Reissued Patent: Mar. 26, 2002

(54) INTERACTIVE MASCARA BRUSH

(76) Inventor: Mary A. Clay, 2770 E. Uintah #305, Colorado Springs, CO (US) 80909

(21) Appl. No.: 09/672,147

(22) Filed: Sep. 27, 2000

Related U.S. Patent Documents

Reissue of:
(64) Patent No.: 5,937,871
Issued: Aug. 17, 1999
Appl. No.: 09/286,477
Filed: Apr. 5, 1999

(51) Int. Cl.[7] ..... A45D 40/26
(52) U.S. Cl. ..... 132/218; 132/217; 132/320
(58) Field of Search ..... 132/218, 216, 132/217, 320; 15/164, 172, 22.3; 401/122, 126, 129, 174, 172, 194, 266, 288

(56) References Cited

U.S. PATENT DOCUMENTS 3,739,416 A * 6/1973 Kurachi ..... 15/23
3,998,235 A * 12/1976 Kingsford ..... 132/218
4,084,282 A * 4/1978 Calvert ..... 15/38
4,165,755 A * 8/1979 Cassal et al. ..... 132/218
4,428,388 A * 1/1984 Cassal et al. ..... 132/218
4,446,880 A * 5/1984 Gueret et al. ..... 132/218
4,527,575 A * 7/1985 Vasas ..... 132/218
4,545,393 A * 10/1985 Gueret et al. ..... 132/218
4,632,136 A * 12/1986 Kingsford ..... 132/218
4,632,736 A 12/1986 Kingsford ..... 401/127
5,086,793 A * 2/1992 Kingsford ..... 132/218
5,137,038 A * 8/1992 Kingsford ..... 132/218
5,301,381 A * 4/1994 Klupt ..... 15/22.1
5,851,079 A * 12/1998 Horstman et al. ..... 401/174
6,145,145 A * 11/2000 Besel ..... 15/22.3

* cited by examiner

*Primary Examiner*—Pedro Philogene
(74) *Attorney, Agent, or Firm*—Mark G. Pannell; Hanes & Schutz, P.C.

(57) ABSTRACT

A mascara applicator (50) comprising: a handle end portion (20); an opposite bristle/brush end portion (90); and a button (30) positioned on the handle end portion (20) which when radially depressed causes the bristles to move with respect to the applicator (50), so that one may hold the handle end portion (20) and depress the button (30) with a single hand to apply mascara.

29 Claims, 5 Drawing Sheets

INTERACTIVE MASCARA BRUSH

Matter enclosed in heavy brackets [ ] appears in the original patent but forms no part of this reissue specification; matter printed in italics indicates the additions made by reissue.

BACKGROUND

1. Field of Invention

This invention relates to an interactive mascara applicator where one aspect comprises; a handle end portion; an opposite brush end portion having bristles; and a button positioned on the handle end portion which when radially depressed causes the bristles to move with respect to the applicator, so that one may hold the handle end portion and depress the button with a single hand to apply mascara.

2. Description of Prior Art

The conventional mascara applicator has a handle located at its top end, a brush located at its bottom end, and a rod located in between the two, connecting the handle with the brush. The handle is used for gripping and maneuvering the entire assembly while the brush is used for stroking and coating the lashes.

The brush section of most commercial mascara applicators are fixed and permanently attached to the rod however, there have been some brush sections shown in the prior art that are adjustable. For example in U.S. Pat. No. 4,446,880 to Gueret and Arraudeau a makeup applicator is disclosed where the diameter of the brush section is adjustable. When a knob is rotated between a high and low position, the rod moves axially causing the bellow or brush section to bulk outward resulting in a change in the diameter of the brush.

In U.S. Pat. No. 3,998,235 to Kingsford an applicator is described where the spacing between the bristles of the brush are adjustable through a tension adjusting means. The brush section, which is generally characterized by a coil or a spring gets compressed causing the spacing between the bristles to be altered.

In another U.S. Pat. No. 5,137,038 to Kingsford, a mascara applicator is disclosed in which the applicator head's curvature can be altered by way of an adjusting rod. The rod can be extended into the applicator head so as to straighten a pre-curved applicator.

In each of the prior art patents disclosed, the adjustment of the brush section is shown to occur only prior or subsequent to the actual application. In other words, a user must stop, pre-select the desired adjustment position, and then proceed with using the brush. The prior art patents do not allow for any changes in the configuration of the applicator's brush section during the actual application. Further, each of the prior art patents discussed above do not allow the brush section to be replaced when needed. This is an important issue in most commercial institutions where consumers desire to try on mascara products prior to the purchased. Some commercial institutions offer sample mascara tubes but, generally the same brush is used by all. This can present a serious hygiene problem if the brush gets contaminated.

OBJECTS AND STATEMENT OF INVENTION

Accordingly, the advantages of my invention are:

to disclose an applicator where the shape of the brush section and/or the bristle alignment within the brush section can be interactively altered.

to disclose an applicator where the brush section can interactively rotate.

It is a further object of this invention to disclose an expandable applicator brush sleeve that can be removed or replaced whenever needed.

The objects and advantages delineated above are achieved according to the invention in that the applicator assembly has a set of "push and release" buttons located on the assembly's handle end portion. When the "push and release" buttons are engaged (pushed in), the bristles within the brush section react immediately by changing their alignment, shape, or s by causing the entire brush section to rotate. Likewise, when the "push and release" buttons are disengaged (not pushed in), the bristles return to their original position. In other words, the "push and release" buttons create an interactive relationship between a user's operational commands and the derivative positioning of the bristles within the brush section. In addition, the brush section is an expandable sleeve that fits over the bottom end of the applicator rod and is replaceable.

An interactive approach is defined as a two way mechanical communication system that involves little or no time delay between a mechanical action that gets performed by a user and a reciprocal mechanical reaction that results from the issued operational command. This approach allows a user to engage in and choose from an array of bristle arrangements all without having to stop in the middle of the application process to perform any additional adjustments. It is believed that discretionary changes made by a user to the relative positioning of the bristles within the brush section (while the makeup is being applied) increases the likelihood of the lashes to arrange themselves in between the bristles for maximum make up coating. This is in stark contrast with a fixed brush arrangement where it is believed that during the initial stroking of the brush to the lashes, the lashes tend to glide across the surface of the bristles, getting coated by the fluid located on the bristle's top edge.

The effect of an "interactive" approach is twofold. First, by giving the bristle's of the brush the capability to be altered in "real time"—during the actual application of the makeup to the lashes, allows changes in combing or stroking patterns to be immediate and direct resulting in no delays during application. This is especially convenient since most mascara formulas today dry quickly once they get exposed to air. Second, the amount or level of "mechanical adjustment" that occurs either among the bristles of the brush, or to the degree that the brush section rotates is directly controlled by the user.

Further objects and advantages of my invention will become apparent from a consideration of the drawings and ensuing description.

DRAWING REFERENCE NUMERALS

10 Expandable/Deformable Sleeve with Bristles
20 Handle End Portion
30 Button
31 Cam Extension End
40 Sliding Rod
41 Cam Follower End
50 Mascara Applicator
60 Primary Spring
61 Secondary Spring
70 Applicator Housing
80 Sleeve Pin
90 Bristle/Brush End Section
100 Piston
110 Gel
120 Stationary Bar
130 Secondary Button
131 Rack Extension End
140 Longitudinal Rod
150 Pinion
160 Passageway having Bottom End Side Orifice

DESCRIPTION—FIGS. 1 TO 6

Figure 1A:
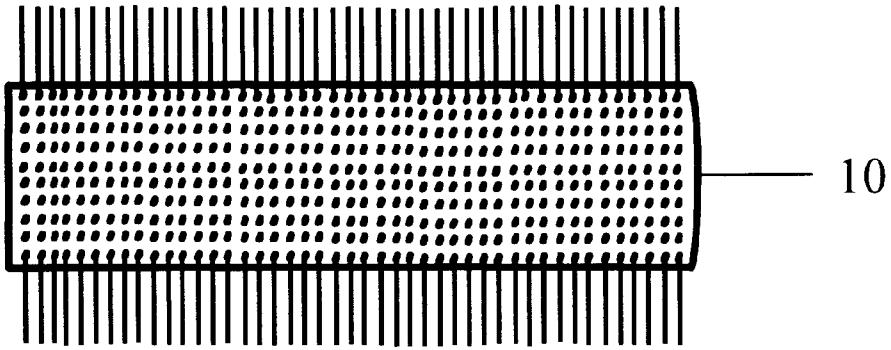
FIG. 1A shows a deformable applicator sleeve with a plurality of bristles located within its external surface area.
Figure 1B:
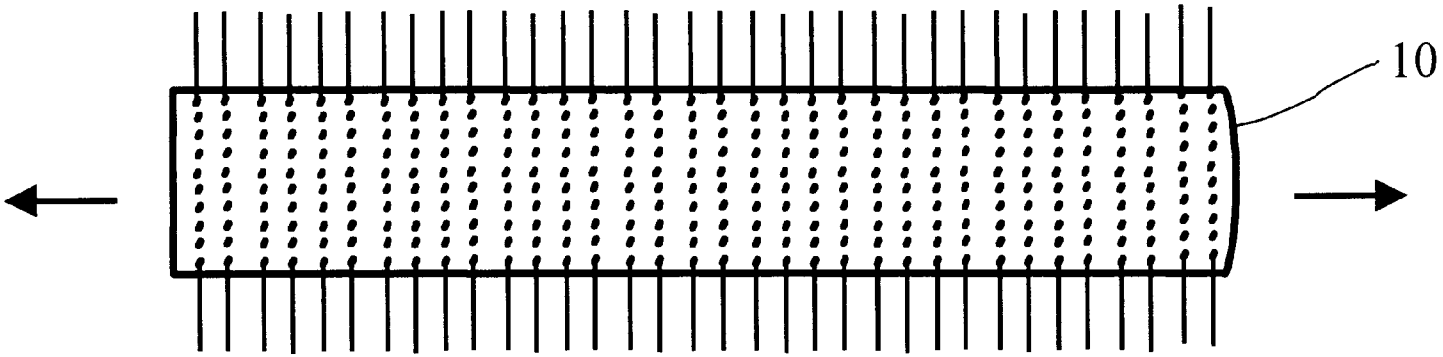
FIG. 1B shows the applicator sleeve of 1A in an expanded state.

FIGS. 1A and 1B show an applicator sleeve 10. Sleeve 10 is made of a stretchable or deformable material which can cover an object and mimic its shape. Bristles have been permanently placed within the exterior surface of sleeve 10.

Figure 2:
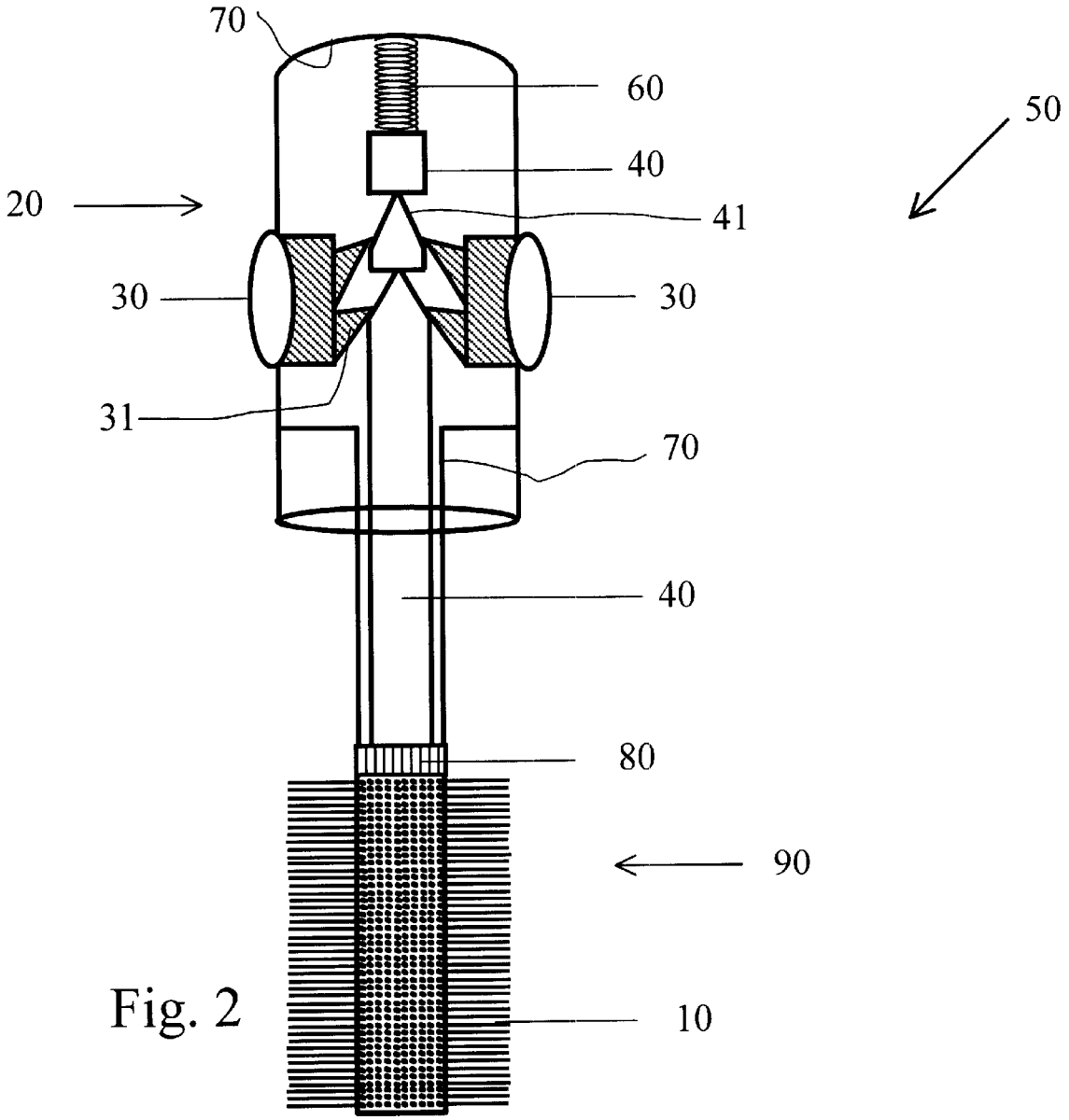
FIG. 2 shows an internal view of an interactive mascara applicator with a set of push and release buttons located on the sides of the handle end portion. This internal view shows mechanisms that enable the applicator rod as well as the bristles within the brush section to be altered.

FIG. 2 shows an internal view of an interactive mascara applicator 50 that enables a user to adjust the alignment of the bristles within the brush section 90. Applicator rod 40 is positioned within handle end 20 where the top end of rod 40 is fixed to one side of spring 60. A second side of spring 60 is fixed to the internal wall of housing 70. The rest of rod 40 extends through housing 70 where it is slidably positioned. One end of the extended portion of housing 70 is fixed to one side of pin 80. A stretchable/deformable applicator sleeve with bristles 10 covers the bottom portion of rod 40 and is releasably attached to a second side of pin 80. Button 30 is slidably positioned within handle end 20. The cam extension end 31 of button 30 is positioned to slide within the inclining path of rod 40's cam follower end 41.

Figure 3:
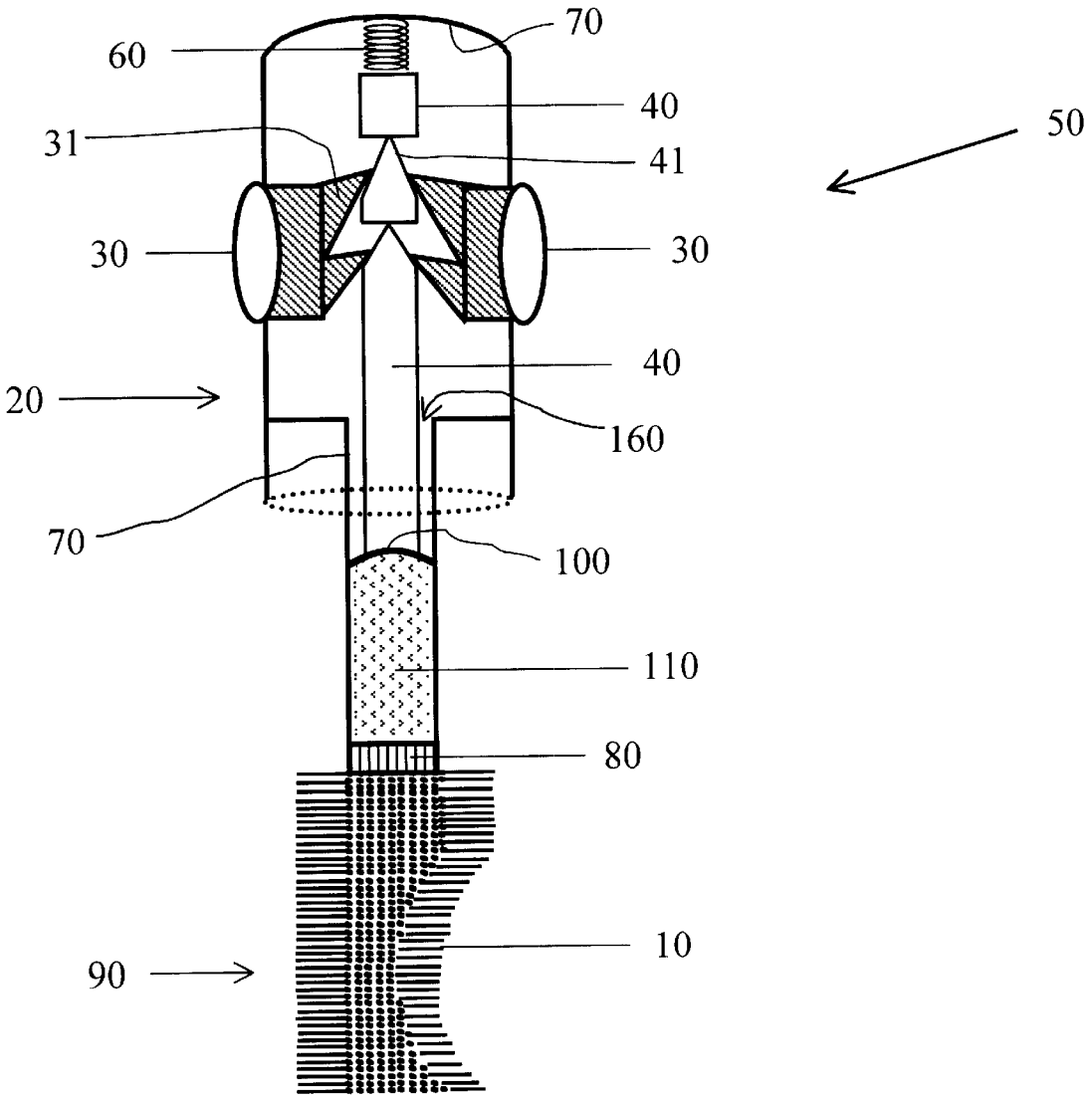
FIG. 3 shows an internal view of an interactive mascara applicator with a set of push and release buttons located on the sides of the handle end portion. This internal view shows the mechanisms that enable the entire shape of the brush section to change.

FIG. 3 shows an internal view of an interactive mascara applicator 50 with mechanisms that enable the shape of the brush section 90 to change. On the inside of applicator 50 at its top is attached a first end of primary spring 60. A second end of primary spring 60 is attached to the top end of sliding rod 40. The bottom end of rod 40 is attached to piston 100. The frame work outlining handle end 20 forms housing 70 and a passageway 160 for rod 40 and piston 100 to travel through. The bottom area of passageway 160 has an orifice located on its side that forms a curvature. Gel 110 is located inside passageway 160, below piston 100. Sleeve 10 covers rod 40's orifice and mimics its curvature shape until it attaches to a first side of pin 80. A second side of pin 80 is attached to the external side of passageway 160. The cam extension end 31 of button 30 is positioned to move within the inclining pathway of rod 40's cam follower end 41.

Figure 4:
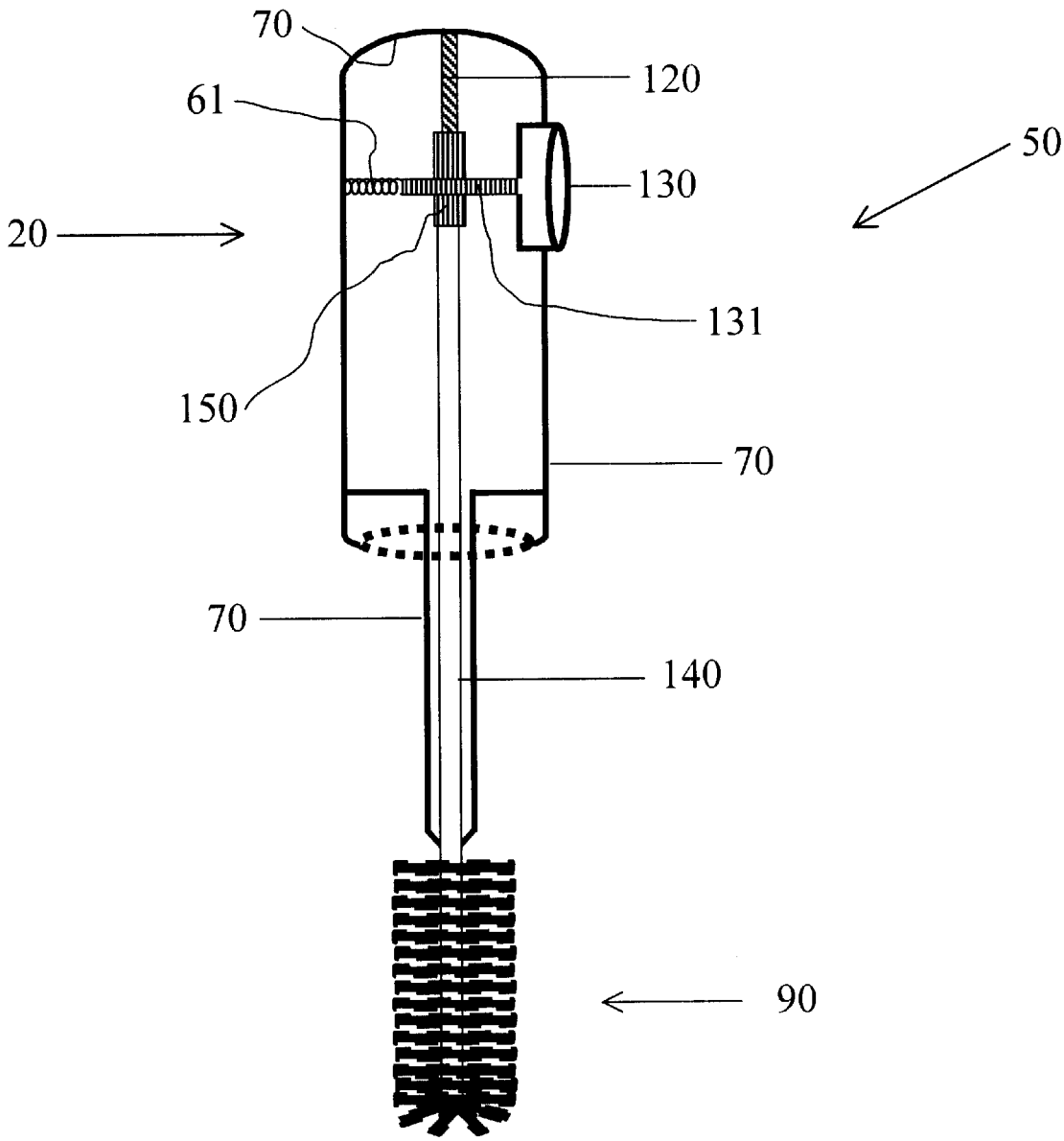
FIG. 4 shows an internal view of an interactive mascara applicator with one push and release button located on the side of the handle end portion. This view shows the internal mechanisms that enable the brush section to rotate.

FIG. 4 shows an internal view of an interactive mascara applicator 50 with mechanisms that allow rod 140 and brush section 90 to rotate. On the inside of handle end 20 at its top is attached a first end of stationary bar 120. A second end of stationary bar 120 is connected to one side of pinion 150 wherein pinion 150 is rotatably mounted. The other side of pinion 150 is connected to longitudinal rod 140. The framework outlining handle end 20 forms housing 70 and extends to cover rod 140. The rack extension 131 of button 130 is slidably positioned within handle end 20 where rack extension 131 is attached to a first end of secondary spring 61. A second end of spring 61 is attached to the inside wall of housing 70. Rack extension 131 is also positioned to turn pinion 150 when button 130 is pressed down.

Figure 6:
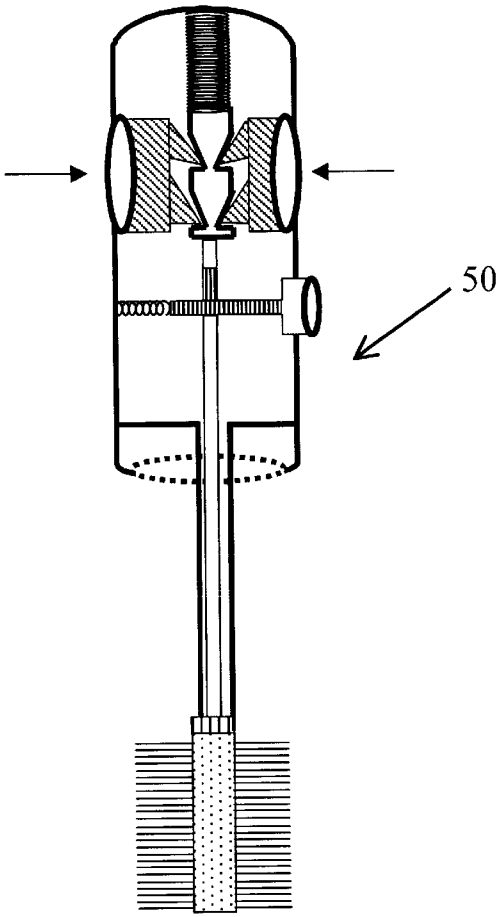
FIGS. 5 and 6 show an internal view of a dual function interactive mascara applicator with mechanisms inside that adjust the alignment of the bristles and that enable the entire brush section to rotate.
Figure 5:
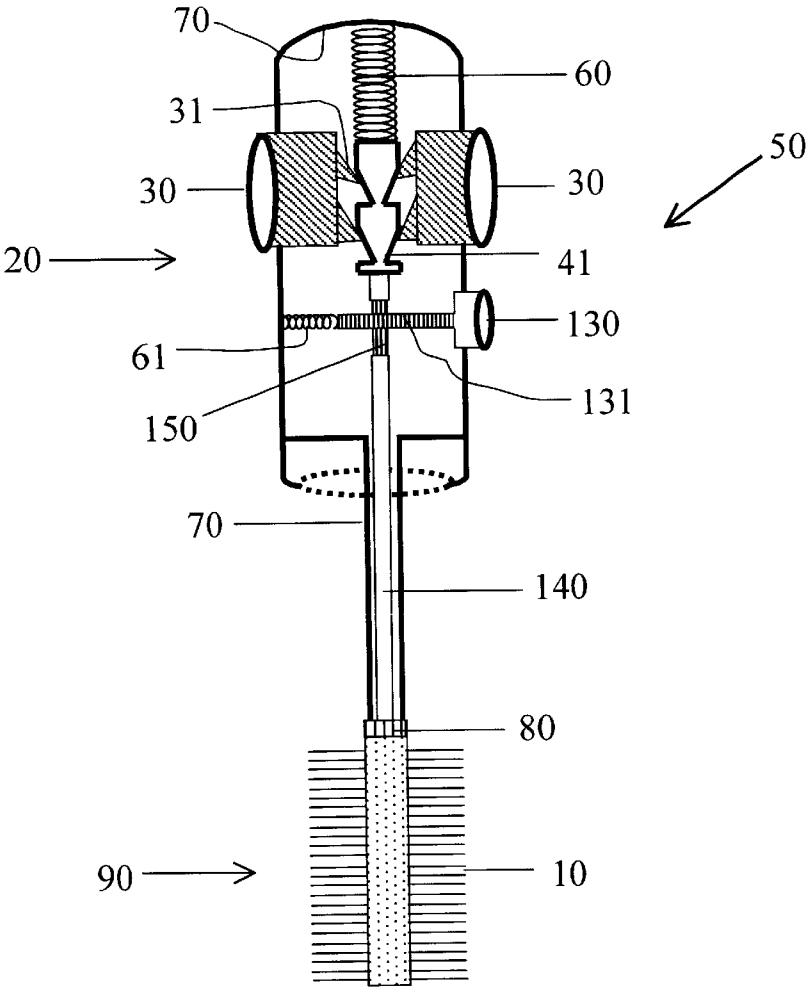

FIGS. 5 and 6 show a dual function interactive mascara applicator 50 with mechanisms that adjust the alignment of the bristles within sleeve 10 and that enable the entire brush section 90 to rotate. On the inside of mascara applicator 50 at its top is attached a first end of primary spring 60. A second end of primary spring 60 is attached to a first side of cam follower end 41. A second side of cam follower end 41 is attached to a first end of pinion 150 wherein pinion 150 is rotatably mounted. A second end of pinion 150 is connected to longitudinal rod 140. Sleeve 10 covers the bottom part of rod 140 and is attached to one side of pin 80. A second side of pin 80 is attached to housing 70. Button 30 is slidably positioned within handle end 20. The cam extension end 31 of button 30 is positioned to move within cam follower end 41. Button 130 is also slidably positioned within handle end 20. The rack extension end 131 of button 130 is attached to a first end of secondary spring 61. An opposite end of spring 61 is attached to the inside wall of housing 70. Rack extension 131 is positioned to turn pinion 150 when button 130 is pressed and to allow rod 140 to longitudinally slide.

OPERATION—FIGS. 1 TO 6

In FIGS. 1A and 1B, applicator sleeve with bristles 10 is made of a stretchable or deformable material which can cover an object (an applicator rod) and mimic its shape. Sleeve 10 is completely enclosed except for an opening located on one of its ends that allows the object to enter and exit. FIG. 1B shows sleeve 10 in a stretched or expanded state with its bristles separated at a greater distance than the bristle arrangement shown in FIG. 1A.

FIG. 2 shows an internal view of an interactive mascara applicator 50 that enables a user to adjust or change the alignment of the bristles within its brush section 90. When button 30 is pressed within handle end 20, cam extension 31 moves down the slanted pathway of rod 40's cam follower end 41. As this movement occurs, rod 40 gets displaced and moves further inside sleeve 10, causing sleeve 10 to expand or stretch. This "stretching" has the effect of changing the bristle's alignment. Simultaneously, spring 60 stretches. The distance that rod 40 moves determines the amount of distal change that will occur between the bristles within brush section 90.

When button 30 is released (not pressed down), spring 60 flexes back and returns to its original position. Since one end of rod 40 is attached to spring 60, both rod 40 and sleeve 10 are returned to their original positions. The distance that cam extension end 31 of button 30 moves down the inclining pathway of rod 40's cam follower end 41 represent an array of possible distances or positions that rod 40 can stop at and occupy. Each of these positions represent various spacing changes for the bristles on sleeve 10. Whenever a user desires a particular bristle alignment, button 30 is simply depressed and held at a particular point. Pin 80 serves to attach sleeve 10 to housing 70.

FIG. 3 shows an internal view of an interactive mascara applicator 50 that enables a user to modify the shape of its brush section 90. When button 30 is pressed within handle end 20, cam extension rod 31 moves down the slanted pathway of rod 40's cam follower end 41. As this movement occurs, rod 40 and piston 100 get displaced and move further within passageway 160. Since sleeve 10 covers the orifice located at the bottom end of passageway 160, the curvature in brush section 90, at the site of the orifice changes as piston 100 moves more gel 110 further within passageway 160. Simultaneously, as button 30 is pressed inside handle end 20, spring 60 stretches. The distance that piston 100 moves gel 110 inside passageway 160, determines the amount of change that will occur to the curvature within brush 90 or to sleeve 10. Pin 80 serves to attach sleeve 10 to the external side of passageway 160 or housing 70.

When button 30 is released (not pressed down), spring 60 flexes back returning rod 40 and piston 100 to their original positions. Gel 110 returns to its original disbursement level throughout passageway 160. Brush section 90 also reverts back to its original form.

The distances that piston 100 can move gel 110 within passageway 160 represent an array of possible brush section curvatures. Whenever a user desires a particular brush curvature (or non-curvature), button 30 is simply depressed and held at a particular point.

In FIG. 4, an interactive mascara applicator 50 is shown with mechanisms that allow its brush section 90 to rotate. When button 130 is pressed within handle end 20, rack extension 131 turns pinion 150 and presses against spring 61. Since longitudinal rod 140 is attached to pinion 150 at one end and brush section 90 at an opposite end, rod 140 and brush section 90 rotate when pinion 150 rotates. The other side of pinion 150 is attached to one end of stationary bar 120 which does not rotate due to bar 120 being permanently fixed to one side of the internal wall of housing 70. However, pinion 150 is mounted in such a way about bar 120 that it remains attached and is itself capable of rotating. The framework outlining handle end 20 forms housing 70 and extends to cover longitudinal rod 140 where, at extended housing 70's bottom end an opening is formed where rod 140 and brush section 90 emerge.

When button 130 is released (not pressed down), spring 61 flexes back and counter-rotates pinion 150. This causes rod 140 and brush section 90 to also counter-rotate, returning both to their original positions. FIGS. 5 and 6 show a dual function interactive mascara applicator 50 that enables a user to adjust the alignment of the bristles in its brush section 90 or to rotate the entire brush section 90. The direction that rod 140 travels is reversed in this figure when compared to the direction that rod 40 travels in FIGS. 2 and 3. This is due to the reverse placement of cam extension end 31 of button 30 and the reversed placement of rod 40's cam follower end 41.

To adjust the spacing between the bristles within brush section 90, button 30 is pressed within handle end 20. Cam extension read 31 of button 30 moves down the slanted pathway of cam follower end 41. As this movement occurs, cam follower end 41 compresses spring 60 and pulls rod 140 towards spring 60, thereby shrinking the spacing in between the bristles located on sleeve 10. Pin 80 serves to attach sleeve 10 to housing 70.

When button 30 is released (not pressed down), the compression upon spring 60 is released, causing spring 60, rod 140 and sleeve 10 to return to their original position.

To rotate brush section 90, button 130 is pressed within handle end 20. Rack extension 131 of button 130 turns pinion 150 and presses against springs 61. The rotation of pinion 150 causes rod 140 and brush section 90 to rotate.

When button 130 is released (not pressed down), the compression on spring 61 is released causing spring 61 to flex back and pinion 150 to counter-rotate. This causes rod 140 and brush section 90 to counter-rotate, returning both to their original positions.

SUMMARY, RAMIFICATION, AND SCOPE

An interactive approach allows a user to engage in and choose from an array of bristle arrangements and brush shapes all without having to stop in the middle of the application process to perform any adjustments. A set of "push and release" nodes are generally located within an assembly's handle end portion. When the "push and release" nodes are engaged (pushed in), the bristles on the brush interactively respond. This immediate reaction changes either the bristle alignment, brush section's shape or causes the brush section to rotate. Likewise, when the "push and release" nodes are disengaged (not pushed in), the bristles return to their original position.

The effect of an "interactive" approach is twofold. First, by giving the [bristle's] *bristles* of the brush the capability to be altered in "real time"—during the actual application of the makeup to the lashes, allows changes in combing or stroking patterns to be immediate and direct resulting in no delays during application. This is especially convenient since most mascara formulas today dry quickly once they get exposed to air. Second, the amount or level of "mechanical adjustment" that occurs either among the bristles of the brush, or to the degree that the brush section rotates is directly controlled by the user.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by just the examples [giving] *given*.

I claim:

1. A mascara applicator of the type having a handle end portion and an opposite bristle end portion having bristles, wherein the improvement comprises:

a button/slide positioned on the handle end portion which when [radially] depressed causes the bristles to move with respect to the applicator, so that one may hold the handle end portion and depress the button/slide with a single hand to apply mascara.

2. An applicator as in claim 1 wherein the button/slide is biased to a raised position and wherein the bristles are additionally moved when the button moves from a depressed position to a raised position.

3. An applicator as in claim [2] *1* wherein there are two buttons/slides, which are generally opposite each other, so that the buttons/slides are depressed when said button/slides are squeezed together.

4. An applicator as in claim 3 wherein the interior portions of the buttons/slides comprise a cam which contacts a cam follower end of a sliding rod configured so that when the buttons/slides are depressed the rod slides within the applicator.

5. An applicator as in claim 4 wherein the bristles are configured so that said bristles move when the buttons/slides are depressed and the rod slides.

6. An applicator as in claim [5] *3* configured so that when the buttons/slides are depressed the rod slides towards the bristle end portion of the applicator and the bristles are separated.

7. An applicator as in claim [6] *1* wherein the bristles are arranged on an expandable sleeve.

8. An applicator as in claim 4 wherein an end of the sliding rod, opposite the cam follower end portion, comprises a piston which moves a gel which causes the bristles to move.

9. An applicator as in claim [2] *1* wherein an interior portion of the button comprises a rack which rotates a longitudinal rod carrying a pinion when the button/slide is depressed.

10. An applicator as in claim 8 wherein the bristles are rotated when the rod is rotated.

11. An applicator as in claim 5 configured so that when the buttons/slides are depressed the rod slides towards the handle end portion of the applicator and the bristles are squeezed together.

12. An applicator as in claim 11 further comprising a third button/slide having an interior having an interior portion comprising a rack and wherein the rod carries an elongated pinion, arranged so that when the third button/slide is depressed the rod is caused to rotate.

13. An applicator as in [proclaim] *claim* 12 wherein the bristles are squeezed together when the opposite buttons/slides are depressed and wherein the bristles are rotated when the third button/slide is depressed.

*14. A mascara applicator comprising:*

(*a*) *a housing;*

(*b*) *an actuator carried by the housing and depressible transversely of the housing;*

(*c*) *a rod longitudinally disposed within the housing and extending therefrom;*

(*d*) *means interconnecting the actuator and the rod for translating transverse movement of the actuator into movement of the rod; and,*

(*e*) *bristles coupled to the rod.*

*15. The applicator of claim 14 further including biasing means positioned to oppose depression of the actuator.*

*16. The applicator of claim 15 wherein the biasing means includes a spring.*

*17. The applicator of claim 15 wherein the biasing means bears against the housing.*

*18. The applicator of claim 14 wherein the means for translating transverse movement of the actuator includes:*

(*a*) *a cam follower affixed to the rod; and,*

(*b*) *a cam extension affixed to the actuator and positioned to engage the cam follower up depression of the actuator causing longitudinal movement of the rod.*

*19. The applicator of claim 14 wherein the means for translating transverse movement of the actuator includes:*

(*a*) *a pinion affixed to the rod; and,*

(*b*) *a rack extension affixed to the actuator and positioned to engage the pinion upon depression of the actuator causing rotational movement of the rod.*

*20. The applicator of claim 14 further including an expandable sleeve affixed to the housing and engaging the rod, wherein the bristles are embedded in the expandable sleeve.*

*21. The applicator of claim 20 further including:*

(*a*) *a piston within the housing and engaging the rod; and,*

(*b*) *a fluid within the housing and the expandable sleeve, the fluid providing communication between the piston and the expandable sleeve.*

*22. A movement mechanism in a mascara applicator having a housing, a rod disposed within the housing and extending therefrom, and bristles coupled to the rod, the movement mechanism comprising:*

(*a*) *an actuator carried by the housing and depressible transversely of the housing; and,*

(*b*) *means interconnecting the actuator and the rod for translating transverse movement of the actuator into movement of the rod.*

*23. The movement mechanism of claim 22 further including biasing means positioned to oppose depression of the actuator.*

*24. The movement mechanism of claim 23 wherein the biasing means includes a spring.*

*25. The movement mechanism of claim 23 wherein the biasing means bears against the housing.*

*26. The movement mechanism of claim 22 wherein the means for translating transverse movement of the actuator includes:*

(*a*) *a cam follower affixed to the rod; and,*

(*b*) *a cam extension affixed to the actuator and positioned to engage the cam follower upon depression of the actuator causing longitudinal movement of the rod.*

*27. The movement mechanism of claim 22 wherein the means for translating transverse movement of the actuator includes:*

(*a*) *a pinion affixed to the rod; and,*

(*b*) *a rack extension affixed to the actuator and positioned to engage the pinion upon depression of the actuator causing rotational movement of the rod.*

*28. The movement mechanism of claim 22 further including an expandable sleeve affixed to the housing and engaging the rod, wherein the bristles are embedded in the expandable sleeve.*

*29. The movement mechanism of claim 28 further including:*

(*a*) *a piston within the housing and engaging the rod; and,*

(*b*) *a fluid within the housing and the expandable sleeve, the fluid providing communication between the piston and the expandable sleeve.*

* * * * *